United States Patent [19]
Johnson

[11] Patent Number: 4,680,858
[45] Date of Patent: Jul. 21, 1987

[54] METHOD OF MANUFACTURE OF STRAIN GAUGES

[75] Inventor: Harvey R. Johnson, Suffolk, England

[73] Assignee: Strain Measurement Devices Limited, England

[21] Appl. No.: 886,357

[22] Filed: Jul. 17, 1986

Related U.S. Application Data

[62] Division of Ser. No. 578,218, Feb. 8, 1984, Pat. No. 4,633,212.

[30] Foreign Application Priority Data

Feb. 9, 1983 [GB] United Kingdom ............... 8303555

[51] Int. Cl.[4] .......................................... H01C 17/06
[52] U.S. Cl. ................... 29/610 SG; 29/620; 29/885; 156/644; 156/663
[58] Field of Search ............ 29/610 SG, 610, 620, 29/842, 844, 845, 884, 885, 874; 338/2-6; 156/644, 657, 663; 73/725, 726

[56] References Cited

U.S. PATENT DOCUMENTS

| | | | |
|---|---|---|---|
| 3,444,619 | 5/1969 | Lomerson | 29/884 |
| 3,638,160 | 1/1972 | Huddleston | 338/2 |
| 3,808,678 | 5/1974 | Kubo et al. | 338/2 |
| 3,838,379 | 9/1974 | Gieles et al. | 338/4 |

FOREIGN PATENT DOCUMENTS 48159  5/1981  Japan ..................... 29/842

*Primary Examiner*—Percy W. Echols
*Attorney, Agent, or Firm*—Larson and Taylor

[57] ABSTRACT

In the manufacture of an electrical strain gauge the strain-responsive circuit element is formed from a thin film deposit on a surface of a metal substrate on which an insulating film has already been deposited. Connections are made directly to the circuit element by the ends of conductor leads that are bonded into insulating plugs in apertures in the substrate. The plugs and the insulating film are glasses to which the substrate and the circuit element are bonded. A further glass layer encapsulates the circuit element. As a result a very robust form of gauge is provided that can be used in high temperatures and in chemically active environments.

7 Claims, 5 Drawing Figures

METHOD OF MANUFACTURE OF STRAIN GAUGES

This application is a divisional of my U.S. patent application Ser. No. 578,218 filed Feb. 8, 1984, now U.S. Pat. No. 4,633,212.

BACKGROUND OF THE INVENTION

The invention relates to electrical strain gauges.

In the design and use of electrical strain gauges, it is important to ensure that a stable response can be obtained from the strain-responsive electrical element that is directly or indirectly attached to the member the strain of which is to be measured, if accurate measurements are to be made.

For this purpose, strain-responsive elements deposited on a suitable substrate by thin-film techniques are found to be superior to elements etched from a plated-on foil. These techniques can provide a firmly adherent layer on a substrate, and so provide a strain-responsive element that is free of problems of long-term creep and hysterisis occuring in the use of foils bonded onto the substrate by a plastics adhesive (e.g. epoxy resin), as well as avoiding the temperature limitations imposed by such adhesives.

Known thin-film techniques comprise methods of forming solid layers by condensation from the vapour phase, including vacuum deposition processes, e.g. sputtering and chemical vapour deposition. Such layers are usually deposited with a thickness of less than 2 microns, although greater thicknesses are possible, and the resultant thin-film will have characteristics typical of a discontinuous layer or of a bulk material depending upon the thickness. The term "thin-film" as used herein is intended to refer to deposits produced by thin-film techniques and capable of providing a flow path for an electrical current.

Strain gauges incorporating such strain-responsive elements typically comprise a layer of glass or other insulating material deposited on a surface of the member to be monitored, e.g. by sputtering, as an insulating layer, the underlying member commonly being metallic, and a thin-film strain-responsive layer deposited on the insulating layer and etched to form a resistive circuit element. The connection of the element to an external measurement circuit is made by wire bonds using a printed circuit board also attached to the surface of the member adjacent to the resistive element for the junction of the wire bonds with the lead-outs to the measuring circuit. However, these wire bonds are relatively fragile in use and may be prone to chemical attack.

Another aspect of strain gauge measurement lies in that it is often desirable to operate in hostile environments. It is well known to cover a strain gauge element with organic encapsulating materials which serve to protect the element from dirt and moisture, but this measure is of little use at high temperatures. Moreover, the adherence of a plated out strain gauge element will be lost if it is subjected to temperatures above the limits for the adhesive bonding materials and substrates used to attach the element to the member being monitored, and even though a thin-film element may itself be resistant to high temperatures the printed circuit board by which it is connected to the measurement circuit is not.

As a result, when the critical parameter to be monitored is the strain at a position such as the inner wall of a container, e.g. a pressure vessel, filled with heated fluid, it may not be possible to site a strain gauge on the surface in question. The measurement must then be made indirectly from another region of the container walls, with the result that there is a loss of accuracy and of stability in the strain signals generated.

Finally it may be mentioned that a form of packaging for the solid state devices is known from U.S. Pat. No. 3,444,619 to improve the durability of the device, in which the device is attached by an adhesive such as solder to a base element in apertures of which electrical leads have been fixed in insulating glass inserts, the wire bonds of the device being connected to the exposed ends of the inserted leads, and a metal cover then being soldered or welded to the base element to enclose the solid state device and the wire bond connections to the leads. Such an arrangement if employed for a strain gauge would have little value, however, in meeting the problems outlined above.

SUMMARY OF THE INVENTION

According to the invention, there is provided a method of manufacturing an electrical strain gauge in which
(i) conductor leads are secured in apertures passing through a metallic substrate with insulating material surrounding the leads in the substrate to isolate them therefrom,
(ii) a surface of the substrate to which said leads extend is polished smooth with the ends of the leads made flush with said surface,
(iii) a deposit of an insulating material in the form of a film bonding with the metallic substrate is laid on said surface,
(iv) with said ends of the leads exposed, a thin-film deposit for a strain-sensitive electrical circuit element is applied to bond with the insulating film and to make electrical contact with the leads, and
(v) a protective or passivating layer is applied over the circuit element.

In this manner, the connecting leads for an external measurement circuit are inserted and fixed in the substrate or body of the strain gauge before the deposition of the circuit element material, to be put in direct contact with the thin-film element generating strain-responsive signals and without the interposition of wire bonds. Moreover, the leads can easily be arranged to emerge from the substrate on the opposite face to that carrying the thin-film element.

The initial insulating layer and the overlying protective layer may be each composed of glasses, thereby offering a high tolerance to elevated temperatures and corrosive substances, and they may be applied by sputtering. Glasses may also be used in the form of plugs in said apertures to bond the conductor leads in place and isolate them from the metallic substrate.

The resistive material may be deposited in the final form of the circuit element, possibly by the use of masks, or it may be etched to the required pattern after deposition. A layer of conductive material may be applied to discrete portions of the circuit element in the immediate areas of said lead ends before the protective or passivating layer is applied, in order to increase the conductivity in said areas and shunt the overlaid portions of the circuit element, but it will not usually be necessary to apply the conductive material as a thin-film deposit. If etching methods are used to form the circuit element and said conductive areas, the different materials can be etched in separate baths sequentially or a common bath with selective etchants may be used for acting on the circuit element and its associated conductive areas simultaneously.

BRIEF DESCRIPTION OF THE DRAWINGS

The invention will be described in more detail by way of example, with reference to the accompanying schematic drawings.

DESCRIPTION OF THE PREFERRED EMBODIMENTS

Figure 1:
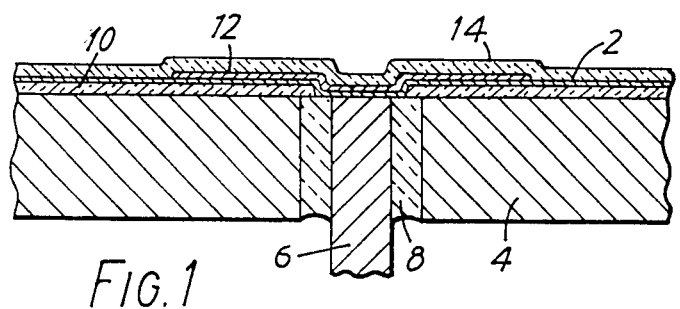
FIGS. 1 and 2 are detail sectional views of a part of a strain gauge manufactured in accordance with the invention and a broken-away plan view of the same part of the gauge respectively, illustrating the connection of a conductor lead to the strain-sensitive element.
Figure 2:
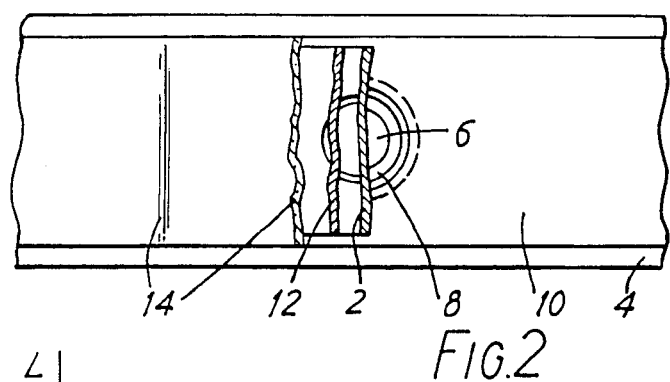

In FIGS. 1 and 2 can be seen a strain-responsive electrical resistance element 2, e.g. of Nicrome, formed as a thin-film deposit on a supporting body or substrate 4. The element is in contact with a conductor 6, e.g. of Kovar (Trade Mark)(e.g. Fe 53.8, Ni 29, Co 17, Mn 0.2%), that provides a lead-out through the thickness of the substrate to connect the element with a strain-measurement circuit (not shown). The substrate 4 is metallic, e.g. of stainless steel, and is insulated from the conductor by a glass plug 8 bonded to both. Underlying the resistance element 2 is a glass layer 10 insulating it also from the metallic substrate, but this layer is interrupted at the conductor 6, to establish contact between the conductor and the resistance element 2 at that point, while overlapping the plug 8 to keep the element 2 isolated from the substrate. Over the area of contact between the element 2 and the conductor 6, and the adjacent region, an electrically conductive layer 12, e.g. of copper or aluminium, is put down on top of the thin-film deposit 2, this layer possibly being somewhat thicker than the deposit 2, and both are encapsulated by a glass passivating layer 14.

The strain gauge will have a plurality of conductors 6 making contact with spaced regions of the thin-film deposit 2 and at each such region there may be a local deposit of the conductive material layer 12 so as to control the area of the thin-film deposit from which measurements are made and thereby increase the sensitivity of those signals. As in known strain gauge configurations there may be a single resistance element or two or more such elements may be formed by the thinfilm deposit, e.g. in a rosette pattern. The conductive deposits over the resistive element act each as a shunt, particularly over the junction regions with the conductors, to exclude these regions from the resistance measurement and thereby eliminate stray signals.

In the formation of the strain gauge, holes are first drilled in the metallic substrate 4 to receive the conductors 6 and glass plugs 8 are inserted in these holes, the conductor leads then being pushed through the plugs while the glass is plastic to project slightly above the surface on one side of the substrate. With the glass bonding and sealing the leads in their holes, the surface of that side of the substrate is ground and polished to a high degree of flatness, and the glass layer 10 is deposited, conveniently by radio frequency sputtering to form an insulating layer about 6 microns thick. Before the layer 10 is deposited, the areas immediately over the polished ends of the conductors 6 are masked but the masking allows the glass layer 10 to overlap the annular end-section areas of the associated glass plugs so that a continuous insulating barrier covers the face of the substrate.

In some instances, e.g. because of a particular circuit pattern layout, it may not be practical to mask the substrate during the deposition of the glass layer 10. The ends of the conductors 6 can then be exposed by etching the glass layer before proceding to the next step.

For this following step, Nichrome is deposited on the surface of the glass layer 10 and the exposed ends of the conductors, also conveniently by radio frequency sputtering to a thickness somewhat less than 1 micron, and the deposit is applied through a mask or is etched after deposition to form one or more resistance elements. The preceding masking of the glass layer 10 ensures that the resistance element 2 makes good contact with the end faces of the conductors, although it is completely isolated from the metallic substrate.

A further deposit is now laid down, this time of an electrically conductive material to provide the layer 12, preferably somewhat thicker than the resistive material layer, and the deposition surface is either masked or the deposit is subsequently etched to confine the conductive material layer to specific regions including the areas immediately over the discontinuities in the initial insulating glass layer 10. The final passivating layer 14 of glass, some 2–6 microns thick is then applied over the resistive and conductive deposits 2,12 to encapsulate them.

With a strain gauge constructed in this manner, the advantages of using a thin-film strain-responsive element are available without the disadvantage of requiring wire bonds. In addition the construction is compact and can be used in chemically active environments and at elevated temperatures far beyond the capabilities of conventional strain gauges. If the strain gauge fronts onto a space containing corrosive materials and/or at a high temperature, the conductors emerging from the opposite side of the substrate can be protected from that environment. At the same time, the conductors provide very simple and robust lead-outs for connecting the strain-sensitive element to an external measuring circuit.

These features allow a design to be produced which can be used in high temperature or chemically active environments but which retains the known advantages of thin-film gauges in long term stability and freedom from creep and hysterisis.

Examples of strain gauges according to the invention formed in the manner described above are shown in FIGS. 3 to 5.

Figure 3:
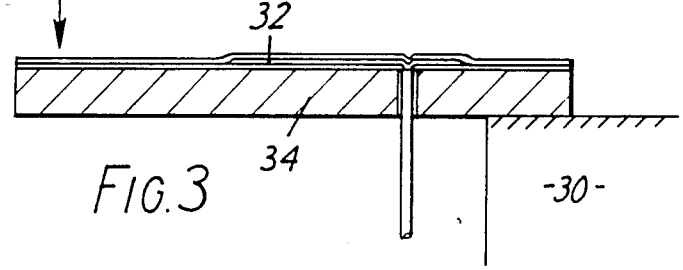
FIGS. 3 to 5 are outline illustrations of different forms of strain gauge according to the invention, having the features shown in FIGS. 1 and 2.

In FIG. 3, a gauge is shown arranged to be used as a cantilever. Projecting from a support 30, the load L applied near its free end places the upper face of the cantilevered substrate or body 34 in tension, the magnitude of which determines the resistance of the thin-film circuit element 32.

Figure 4:
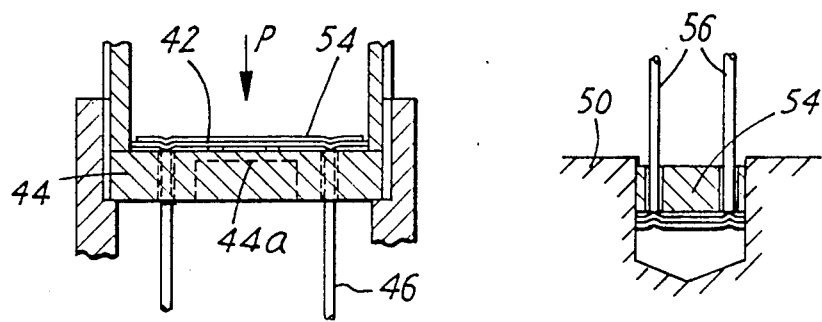

FIG. 4, shows a gauge arranged to measure the pressure P acting on the top face of a diaphragm-like substrate or body 44, for which purpose an area 44a of the body underlying the resistance element has its thickness reduced to increase sensitivity. It will be noted that the element 42 is subjected directly to the strains of the surface exposed to the pressure P, it being protected from hostile atmospheric conditions in the pressure zone by the passivating layer 54, while the disposition of the lead-outs 46 both protects them from these conditions and ensures that the connection of the circuit element to an external measurement circuit (not shown) can be made with no risk of establishing a fluid leakage path through the diaphragm body.

Figure 5:
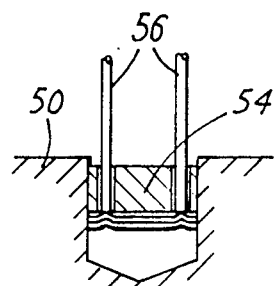

FIG. 5, illustrates a strain gauge and with a plug-form body 54 having the general configuration described in GB No. 2 050 624A. It shows how the lead-outs 56, can be arranged to provide the connections to the external measurement circuit (not shown) while forming an integral part of the plug insert in a bore in the surface of the member 50 being monitored.

I claim:

1. A method of manufacturing an electrical strain gauge comprising a metallic substrate having apertures passing through it, said method comprising the steps of;
   (i) securing conductor leads in said apertures with insulating material surrounding the leads to isolate them from the substrate,
   (ii) polishing smooth a surface of said substrate to which ends of the leads extend and thereby making said ends flush with said surface,
   (iii) depositing and bonding to said surface of the metallic substrate a layer of an electrically insulating material, said layer leaving exposed said ends of the leads,
   (iv) applying and bonding to the insulating layer a thin-film deposit to provide a strain-sensitive electrical circuit element overlying and in electrical contact with said ends of the leads,
   (v) applying a protective layer over the circuit element.

2. A method of manufacturing an electrical strain gauge according to claim 1 wherein the substrate is ground flat after the leads are secured and before the insulating layer is deposited.

3. A method of manufacturing an electrical strain gauge according to claim 2 wherein discontinuities in said insulating layer are formed at the ends of the leads by masking during the deposition of said layer to leave said ends exposed.

4. A method of manufacturing an electrical strain gauge according to claim 2 wherein the insulating layer deposit extends over the ends of the leads and said ends are exposed by a subsequent etching operation of said layer.

5. A method of manufacturing an electrical strain gauge according to claim 4 wherein the strain-responsive element is formed from said thin-film deposit by etching and said insulating layer is also etched to expose the lead ends, both etching operations being performed separately in a common bath.

6. A method of manufacturing an electrical strain gauge according to claim 1 wherein an electrically conductive material layer is formed over discrete areas of the circuit element, each said area overlying a respective exposed end of a lead and extending over a local region of the circuit element beyond the area of the associated lead end.

7. A method of manufacturing an electrical strain gauge according to claim 1 wherein the insulating and protective layers consist essentially of glasses, and at least one of the layers of glasses is deposited by sputtering.

* * * * *